Patented Dec. 11, 1951

2,577,767

UNITED STATES PATENT OFFICE 2,577,767

STABLE, WATER SOLUBLE, CATIONIC MELAMINE FORMALDEHYDE RESINS

George F. Jones, Glens Falls, N. Y., assignor to Imperial Paper and Color Corporation, Glens Falls, N. Y., a corporation of New York No Drawing. Application March 9, 1950,
Serial No. 148,748

13 Claims. (Cl. 260—67.6)

This invention relates to water soluble resins and has for its object the provision of cationic water soluble melamine-formaldehyde resins characterized by stability upon storage both at ordinary room temperature and at temperatures as high as 120° F.

The cationic melamine formaldehyde resins which have been prepared in the past have had the undesirable property of being unstable and of remaining water soluble for relatively short periods of time only. For a number of applications, particularly in the textile decorative arts, the use of a cationic resin, i. e., a resin carrying a positive electrical charge or charges and whose solution when placed in an electrolytic cell will migrate to the negative electrode or cathode upon the application of a direct current, is desirable. Stability of such cationic resins upon storage under ordinary conditions is highly desirable for many reasons.

The principal object of this invention is the production of a water soluble, cationic melamine formaldehyde resin which is stable under ordinary storage conditions but which will cure, or thermoset, when subjected to sufficiently elevated temperatures. This object may be accomplished by reacting melamine, formaldehyde (or a polymer thereof), and an alkylol amine in the presence of a polyhydroxy alcohol, but so controlling the extent of the reaction that the resin formed does not condense beyond the water soluble or dispersible stage. The resin is then temporarily subjected to a low pH and subsequently neutralized. During the reaction, the melamine, formaldehyde, polyhydroxy alcohol, and alkylol amine mixture first appears cloudy; as the reaction proceeds the mixture becomes clear and upon continued reaction it again becomes cloudy. This latter cloudiness is due to the fact that polymerization has proceeded beyond the stage of water dispersibility and is to be avoided in the present process.

The cationic properties of the resin are produced by the introduction into the resin molecule of an amino alcohol followed by acidification of a solution of the resultant resin to a pH of from 0.5 to 2.0. Unless the resin solution is neutralized shortly after acidification, polymerization catalyzed by the acid will cause the resin to become insoluble and gelation will occur.

Stability is imparted to the resin by the co-action of three means: the first of these is by the use of a large excess of formaldehyde, the second is by use of a polyhydroxy alcohol and the third by the use of a suitable quantity of an alkylol amine. I do not know why the use of large amounts of formaldehyde improve the stability of the resin, but I find experimentally that as I increase the amount of formaldehyde above about seven and one-half moles per mole of melamine that the resin becomes increasingly stable. Commercially acceptable stability cannot be secured unless a ratio of at least about seven and one-half, and preferably about ten moles, of formaldehyde per mole of melamine is employed. Quantities in excess of a ratio of twelve moles of formaldehyde per mole of melamine, while not deleterious to the product, are uneconomical and difficult to handle. It should be recognized that stability is a somewhat relative term. If it is unnecessary that the resin have a useful "life" of not more than a very few days, the marginal amount of formaldehyde, i. e., from seven and one-half to eight and one-half moles of formaldehyde per mole of melamine may be employed. To secure stability over longer periods of time, I must use at least about nine moles of formaldehyde per mole of melamine, and as stated above, I prefer to use ten to twelve moles formaldehyde per mole of melamine since I achieve essentially permanent stability at this level. The formaldehyde may be added as such or as a formaldehyde yielding material such as para-formaldehyde.

The addition of a water soluble, polyhydroxy alcohol, such as glycerine, to the reaction mixture also enhances resin stability. Other suitable water soluble polyhydroxy compounds include ethylene glycol, diethylene glycol and water soluble polyethylene glycols of higher molecular weights. I have found that at least about one mole of glycerine per mole of melamine is required to obtain reasonable stability but three moles of glycerine per mole of melamine is preferred and up to four moles have been employed satisfactorily. Polyhydroxy compounds when substituted for glycerine should be introduced on a weight, not molar, basis and should constitute from about ten to fifty per cent of the total weight of the resin forming mixture. The addition of too much glycerine will cause the resin to be "sticky" and not well suited as an ingredient of a printing paste. I do not know precisely how glycerine or other polyhydroxy compound imparts stability to the resin, but as stated above, the presence of glycerine is required for maximum stability.

I have found that resin stability is achieved in still a third way. The introduction of triethanolamine or other hydroxylated amines, or amino alcohols, into the resin unit improves resin stability. It is believed that these compounds are important in the formation of my cationic resins because they react with the formaldehyde melamine reaction mixture to become an integral part of the molecule. Tertiary amines, such as triethyl amine, which have no reactive hydrogen or hydroxyl groups, do not react, and a cationic resin is not formed in my process when such tertiary amines are used instead of amino alcohols. As stated above, I believe that the amino alcohol I use reacts with the melamine formaldehyde condensate, probably through hydroxyl groups, and upon addition of acid, a ternary salt is formed producing cationic properties in the resin. Diethanol and triethanolamines are the preferred alkylol amine addition agents to the melamine resin although any other water soluble amines of the same class or mixtures of such amines may be employed. I may use from about one and one-half to three moles of triethanolamine per mole of melamine; the preferred amount is about two and a quarter moles of triethanolamine per mole of melamine.

I find that the "hand" or flexibility of cloth decorated with pigmented pastes made from the resin compositions herein disclosed is markedly improved by the introduction of glycerine and triethanolamine into the resin. Thus, in addition to these materials acting as resin stabilizers, they also act, at least to some extent, as plasticizers of the cured resin film.

The resins of this invention are further characterized by the fact that it is unnecessary to add a catalyst prior to thermosetting, or curing, the resin. Conventional melamine formaldehyde resins require the addition of a catalyst prior to curing in order to obtain a water resistant, cured film when using the temperature and times practiced in the art. My resins are unique in that they cure satisfactorily at such temperatures in the absence of added catalyst. Although these resins cure readily without catalyst additions, they possess satisfactory storage stability.

The general procedure for carrying out the reaction consists of mixing together the melamine, the added amine, the water soluble polyhydroxy alcohol and formaldehyde and heating the mixture to form a homogeneous solution. Before the reaction has progressed to a point where the resin precipitates, the pH is reduced to 0.5 to 2.0 with a strong mineral acid and soon neutralized back to a pH of 6 to 6.3. The order of mixing is not critical, but it has been found best to mix the melamine, the amine, and the polyhydroxy alcohol before adding the formaldehyde.

The mineral acid, which may be hydrochloric acid, is preferably concentrated and added slowly to the resin. If added too rapidly, local excesses of acid cause polymerization to take place in localized areas resulting in a non-uniform product. It is believed that the speed of addition is dependent upon the efficiency of the distribution of the acid. The solution is stirred during the addition and the temperature maintained preferably at from 72° to 82° C. The neutralization with sodium hydroxide or other base is begun almost immediately after the proper pH has been obtained. Again the change in pH is carried out slowly as before to prevent local excesses with varying rates of polymerization and non-uniformity of product.

When the resin is complete it may be concentrated under vacuum to a solids content of about 75%. This last step is not necessary, but is advisable if it is to be shipped. If concentration beyond 75% solids is attempted, the resin becomes unstable.

In order to understand my invention more fully, the following Examples are given:

Example I 840 grams of melamine, 2333 grams of triethanolamine and 1836 grams of glycerine were mixed and heated to 80° C. To the hot mixture were added 3074 grams of 37.1% formaldehyde, and 1200 grams of 95% paraformaldehyde. The temperature was maintained at 80° C. and the mixture stirred for 15 minutes. At the end of this time 32% hydrochloric acid was slowly added during the following 30 minutes, the addition being carried out while stirring the mixture, and maintaining the temperature at from 72° to 82° C. until a pH of 1.5±.2 was reached. The resulting resin solution was stirred for 1 minute, and then neutralized by the addition of 20% sodium hydroxide while stirring and maintaining the temperature at 70° C. When the pH reached 6.3, the resin was complete.

For economy in shipment the solution was concentrated under vacuum to a solids content of about 75%.

Example II 52.5 grams melamine, 132.0 grams triethanolamine, and 132.5 grams diethylene glycol were mixed and heated to 91° C. in a suitable container equipped with a stirrer, thermometer and reflux condenser. 304 grams of 37% formalin and 79 grams of paraformaldehylde were then added and the mixture heated to 80° C. The mixture was then stirred for 15 minutes with external heat removed. A sufficient quantity of approximately 32% hydrochloric acid was then added to bring the pH value to approximately 1.5±0.5. The mixture was then stirred at this pH for approximately one minute and then neutralized to a pH of 6 with 30% sodium hydroxide solution. The neutralized resin was then concentrated under reduced pressure to a solids content of approximately 75%.

The cationic nature of my resin may readily be demonstrated in either of two ways:

By one method an 800 cc. beaker is fitted with a set of electrodes connected to a regular 6-volt storage battery. The anode is preferably platinum (although steel can be used) in the form of a rectangle 2" x 5". The cathode is a rectangular piece of 40 mesh steel screen having the same dimensions as the anode. The electrodes are placed one inch apart and 700 cc. of aqueous 5% resin solution are placed in the beaker. The circuit is closed and a potential of 6 volts is put across the electrodes. If the resin is cationic, it will be observed to coalesce on the cathode as a white insoluble deposit. Non-cationic resins show either no coalescence on either electrode or coalesce on the anode. Resins meeting the above test can be considered positively charged resins. The resin coalesces on the cathode quite readily.

A second test which may be readily applied consists of adding bentonite to a solution of the resin. By this method a 2% bentonite dispersion in water is diluted to about 20 to 1 with more water and is added to a 1% solution of the resin. If the resin is cationic it will flocculate or precipitate as curds.

The cationic resin prepared in accordance with the foregoing description is particularly useful in the pigment printing and dyeing of textiles as well as for such diverse purposes as preparing wet strength papers and as adhesives.

I claim:

1. A method of preparing a stable, water soluble cationic resin which comprises mixing one mole equivalent of melamine, a water soluble polyhydroxy compound selected from the group consisting of glycerin, glycol, diethylene glycol and polyethylene glycols of higher molecular weight, formaldehyde and an alkylol amine together until a homogeneous mixture is obtained, temporarily adjusting the pH of the mixture to from 0.5 to 2.0, and then raising the pH to from 6 to 7, said polyhydroxy compound being present in an amount of from 10% to 50% of the total weight of the active materials, said formaldehyde being present in an amount of at least seven and one-half moles for each mole of melamine, said alkylol amine being present in at least an equimolecular quantity with the melamine.

2. A method of preparing a stable, water soluble cationic resin which comprises mixing together one mole equivalent of melamine with from one to four mole equivalents of glycerine, at least seven and one-half mole equivalents of formaldehyde, and at least one mole equivalent of of an alkylol amine until a homogeneous mixture is obtained, temporarily adjusting the pH of the mixture to from 0.5 to 2.0, and then raising the pH to from 6 to 7.

3. A method of preparing a stable, water soluble cationic resin which comprises mixing together one mole equivalent of melamine with from 10% to 50% by weight of the resin mixture of diethylene glycol, at least seven and one-half mole equivalents of formaldehyde, and at least one mole equivalent of an alkylol amine until a homogeneous mixture is obtained, temporarily adjusting the pH of the mixture to from 0.5 to 2.0, and then raising the pH to from 6 to 7.

4. A method of preparing a stable, water soluble cationic resin which comprises mixing together one mole equivalent of melamine with from 10% to 50% by weight of the resin mixture of a water soluble polyethylene glycol, at least seven and one-half mole equivalents of formaldehyde, and at least one mole equivalent of an alkylol amine until a homogeneous mixture is obtained, temporarily adjusting the pH of the mixture to from 0.5 to 2.0, and then raising the pH to from 6 to 7.

5. A method of preparing a stable, water soluble cationic resin which comprises mixing together one mole equivalent of melamine with from one to four mole equivalents of glycerine, at least seven and one-half mole equivalents of formaldehyde, and at least one mole equivalent of triethanolamine and heating the mixture until a homogeneous mixture is obtained, temporarily adjusting the pH of the mixture to from 0.5 to 2.0 with a strong mineral acid and then raising the pH to from 6 to 7.

6. A method of preparing a stable, water soluble cationic resin which comprises mixing together one mole equivalent of melamine with from one to four mole equivalents of glycerine, at least seven and one-half mole equivalents of formaldehyde, and at least one mole equivalent of diethanolamine, and heating the mixture until a homogeneous mixture is obtained, temporarily adjusting the pH of the mixture to from 0.5 to 2.0 with a strong mineral acid and then raising the pH to from 6 to 7.

7. A method of preparing a stable, water soluble cationic resin which comprises mixing one mole equivalent of melamine, a water-soluble polyhydroxy compound selected from the group consisting of glycerin, glycol, diethylene glycol and polyethylene glycols of higher molecular weight, formaldehyde, and an alkylol amine together and heating the mixture until a homogeneous mixture is obtained, temporarily adjusting the pH of the mixture to from 0.5 to 2.0, and then raising the pH to from 6 to 7, said polyhydroxy compound being present in an amount of from 10% to 50% of the total weight of the active materials, said formaldehyde being present in an amount of at least ten moles for each mole of melamine, said alkylol amine being present in at least an equimolecular quantity as the melamine.

8. The stable cationic resin obtained in accordance with claim 1.

9. A stable cationic resin obtained in accordance with claim 2.

10. A stable cationic resin obtained in accordance with claim 3.

11. A stable cationic resin obtained in accordance with claim 4.

12. A stable cationic resin obtained in accordance with claim 5.

13. A stable cationic resin obtained in accordance with claim 6.

GEORGE F. JONES.

REFERENCES CITED

The following references are of record in the file of this patent:

UNITED STATES PATENTS

| Number | Name | Date |
| --- | --- | --- |
| 2,317,181 | D'Alelio | Apr. 20, 1943 |